US012811694B2

(12) United States Patent
Horikoshi et al.

(10) Patent No.: US 12,811,694 B2
(45) Date of Patent: Nov. 24, 2026

(54) FREQUENCY OFFSET ESTIMATION APPARATUS, RECEIVING APPARATUS, FREQUENCY OFFSET ESTIMATION METHOD AND PROGRAM

(71) Applicant: NTT, Inc., Tokyo (JP)

(72) Inventors: Kengo Horikoshi, Musashino (JP); Etsushi Yamazaki, Musashino (JP); Seiji Okamoto, Musashino (JP)

(73) Assignee: NTT, Inc., Tokyo (JP)

(*) Notice: Subject to any disclaimer, the term of this patent is extended or adjusted under 35 U.S.C. 154(b) by 339 days.

(21) Appl. No.: 18/283,244

(22) PCT Filed: Mar. 24, 2021

(86) PCT No.: PCT/JP2021/012369
§ 371 (c)(1),
(2) Date: Sep. 21, 2023

(87) PCT Pub. No.: WO2022/201387
PCT Pub. Date: Sep. 29, 2022

(65) Prior Publication Data
US 2024/0187107 A1 Jun. 6, 2024

(51) Int. Cl.
*H04B 10/61* (2013.01)
*H04B 10/079* (2013.01)

(52) U.S. Cl.
CPC ..... *H04B 10/6165* (2013.01); *H04B 10/0795* (2013.01)

(58) Field of Classification Search
None
See application file for complete search history.

(56) References Cited

U.S. PATENT DOCUMENTS

| | | | | |
|---|---|---|---|---|
| 7,522,842 | B1 * | 4/2009 | McNicol | H04B 10/2916 398/160 |
| 2010/0209121 | A1 * | 8/2010 | Tanimura | H04J 14/06 359/239 |
| 2011/0097085 | A1 * | 4/2011 | Oda | H04B 10/516 398/65 |
| 2012/0069854 | A1 * | 3/2012 | Suzuki | H04J 14/06 370/465 |
| 2012/0070159 | A1 | 3/2012 | Ishihara et al. | |
| 2012/0213532 | A1 * | 8/2012 | Hironishi | H04B 10/6161 398/208 |

(Continued)

FOREIGN PATENT DOCUMENTS

| | | | |
|---|---|---|---|
| WO | WO-2010/134321 | A1 | 11/2010 |
| WO | WO-2011/129389 | A1 | 10/2011 |

*Primary Examiner* — Darren E Wolf
(74) *Attorney, Agent, or Firm* — Harness, Dickey & Pierce, P.L.C.

(57) ABSTRACT

A frequency offset estimation device includes a correlation processing unit that obtains a correlation pattern that is a waveform pattern indicating a correlation between a reception signal spectrum and a detection pattern based on a power spectrum of the reception signal or the reception signal spectrum indicating an amplitude spectrum based on the power spectrum and the detection pattern that is a predetermined waveform pattern, and an estimation unit that estimates a frequency offset amount based on a peak position of the correlation pattern obtained by the correlation processing unit.

7 Claims, 12 Drawing Sheets

(56) References Cited

U.S. PATENT DOCUMENTS

| | | | | |
|---|---|---|---|---|
| 2012/0288286 | A1* | 11/2012 | Houtsma ................ | H04B 10/65<br>398/202 |
| 2013/0028595 | A1 | 1/2013 | Nakagawa et al. | |

* cited by examiner

FREQUENCY OFFSET ESTIMATION APPARATUS, RECEIVING APPARATUS, FREQUENCY OFFSET ESTIMATION METHOD AND PROGRAM

CROSS-REFERENCE TO RELATED APPLICATIONS

This application is a 371 U.S. National Phase of International Application No. PCT/JP2021/012369, filed on Mar. 24, 2021. The entire disclosure of the above application is incorporated herein by reference.

TECHNICAL FIELD

The present invention relates to a frequency offset estimation apparatus, a receiving apparatus, a frequency offset estimation method, and a program.

BACKGROUND ART

A coherent optical communication system can transmit information using a degree of freedom of polarization, amplitude, and phase of light to be used. As a result, the coherent optical communication system can further increase the capacity of optical communication as compared with an optical communication system of an intensity modulation system that transmits information using only a change in the intensity of light. In addition, the coherent optical communication system can relatively easily compensate for the influence of signal distortion such as wavelength dispersion and polarization mode dispersion, which cannot be avoided in optical signal transmission using an optical fiber, by digital signal processing. Therefore, the coherent optical communication system is an advantageous optical communication system even in long-distance transmission, and is widely used mainly as an optical communication system for a trunk line.

In a coherent optical communication system, high wavelength stability is required for a laser used in each of transceivers. In the coherent optical communication system, a transmitter is provided with a transmission laser, and a receiver is provided with a local oscillation laser. Since the transmission laser and the local oscillation laser are used for modulation and coherent detection, respectively, it is desirable that the wavelength of the transmission laser and the wavelength of the local oscillation laser coincide with each other. However, in practice, it is difficult to accurately match the wavelength of the transmission laser and the wavelength of the local oscillation laser due to, for example, manufacturing tolerances and temperature changes of the laser. In addition, each laser is allowed to have a frequency error of about 1.8 [GHz] to 2.5 [GHz]. Therefore, in a case where the direction of the frequency error of the transmission laser and the direction of the frequency error of the local oscillation laser are opposite to each other, a frequency offset of 3.6 [GHz] to 5 [GHz] at the maximum occurs.

Such a frequency offset adversely affects signal processing in the receiver. Therefore, after the frequency offset amount is estimated, it is necessary to compensate for the frequency offset based on the estimation result. Since the frequency offset cannot be estimated on the transmission side, it needs to be estimated on the reception side. Conventionally, as a technique for estimating a frequency offset, for example, there is a technique described in Patent Literature 1.

CITATION LIST

Patent Literature

Patent Literature 1: WO 2011/129389 A

SUMMARY OF INVENTION

Technical Problem

Although the estimation method described in Patent Literature 1 can estimate the frequency offset amount with high accuracy, it is assumed that signal processing such as wavelength dispersion compensation, polarization mode dispersion compensation, and Multiple-Input and Multiple-Output (MIMO) processing for polarization channel separation is completed prior to the estimation of the frequency offset amount. These signal processing procedures may be adversely affected by the frequency offset. In particular, in a modulation scheme using multi-level modulation of 16 quadrature amplitude modulation (QAM) or more which has been increasingly used in recent years, in a case where there is a frequency offset, it may be impossible to perform these types of signal processing. In addition, in order to perform wavelength dispersion compensation, it is necessary to first estimate the wavelength dispersion amount, but depending on the estimation method, it is necessary to perform estimation in a state where the frequency offset is compensated for. Therefore, in this case, frequency offset compensation needs to be performed prior to wavelength dispersion compensation. From the above, there is a demand for a technique capable of estimating and compensating for a frequency offset prior to signal processing for compensating for signal distortion such as wavelength dispersion and polarization mode dispersion caused by optical fiber transmission.

In view of the above circumstances, an object of the present invention is to provide a frequency offset estimation device, a reception device, a frequency offset estimation method, and a program capable of compensating for a frequency offset using a reception signal in which signal distortion is not compensated for.

Solution to Problem

An aspect of the present invention is a frequency offset estimation device including a correlation processing unit that obtains a correlation pattern that is a waveform pattern indicating a correlation between a reception signal spectrum and a detection pattern based on a power spectrum of the reception signal or the reception signal spectrum indicating an amplitude spectrum based on the power spectrum and a detection pattern that is a predetermined waveform pattern, and an estimation unit that estimates a frequency offset amount based on a peak position of the correlation pattern obtained by the correlation processing unit.

An aspect of the present invention is a reception device of a coherent optical communication system, the device including a correlation processing unit that obtains a correlation pattern indicating a correlation between a reception signal spectrum and a detection pattern based on a power spectrum of the reception signal or a reception signal spectrum indicating an amplitude spectrum based on the power spectrum, and the detection pattern that is a predetermined waveform pattern, an estimation unit that estimates a frequency offset amount based on a peak position of the correlation pattern obtained by the correlation processing unit, and a compensation unit that compensates for a frequency offset based on the frequency offset amount estimated by the estimation unit.

An aspect of the present invention is a frequency offset estimation method including a correlation processing step of obtaining, by a computer, a correlation pattern indicating a correlation between a reception signal spectrum and a detection pattern based on a power spectrum of the reception signal or the reception signal spectrum indicating an amplitude spectrum based on the power spectrum and a detection pattern that is a predetermined waveform pattern, and an estimation step of estimating, by the computer, a frequency offset amount based on a peak position of the correlation pattern obtained by the correlation processing step.

An aspect of the present invention is a program for causing a computer to function as the frequency offset estimation device.

Advantageous Effects of Invention

According to the present invention, a reception signal whose signal distortion is not compensated for can be used to compensate for a frequency offset.

DESCRIPTION OF EMBODIMENTS

Hereinafter, embodiments of the present invention will be described in detail with reference to the drawings.

The reception device (the receiving apparatus) in the present embodiment compensates for the frequency offset using a reception signal in which signal distortion such as wavelength dispersion and polarization mode dispersion caused by optical fiber transmission is not compensated for. This is because it may be necessary for the frequency offset to be compensated for first in order to estimate and compensate for these signal distortions.

Therefore, the reception device according to the present embodiment estimates and compensates for the frequency offset using the feature amount not affected by the signal distortion due to the optical fiber transmission. Specifically, for example, the power spectrum of the signal is not changed by the optical fiber transmission. The reception device according to the present embodiment estimates and compensates for a frequency offset using a power spectrum of a reception signal or an amplitude spectrum that is a square root of the power spectrum.

The reception device according to the present embodiment generates a power spectrum by converting a main signal into a frequency domain by fast Fourier transform (FFT) and then performing absolute value processing. Alternatively, the reception device generates an amplitude spectrum by converting the main signal into a frequency domain by FFT and then performing absolute value square processing. Note that the reception device may further perform averaging processing. The reception device calculates a correlation between a power spectrum or an amplitude spectrum of a reception signal and a detection pattern, and obtains a peak position of the correlation to estimate a frequency offset amount.

[Method of Estimating Frequency Offset Amount]

As one method of estimating the frequency offset amount, a method of estimating the frequency offset amount based on the centroid position of the power spectrum of the reception signal is considered. When the power spectrum is bilaterally symmetric, the deviation of the centroid position of the power spectrum matches the frequency offset amount.

Figure 1:
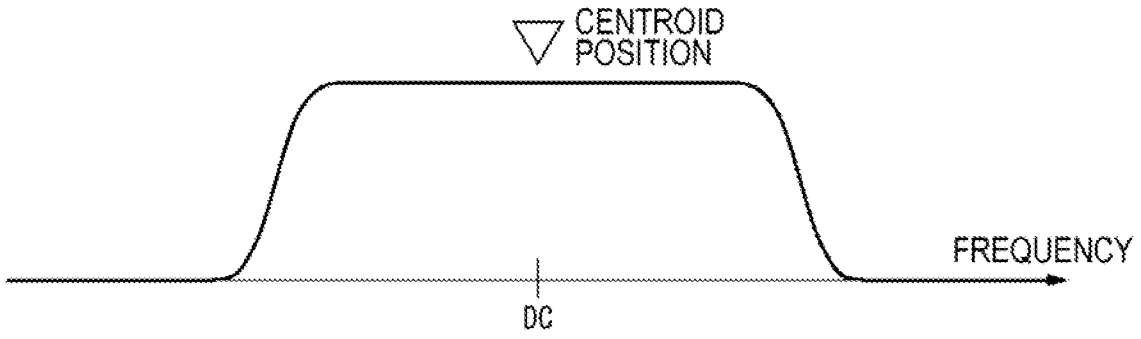
FIG. 1 is a diagram illustrating an example of a power spectrum of a reception signal with no frequency offset.
Figure 2:
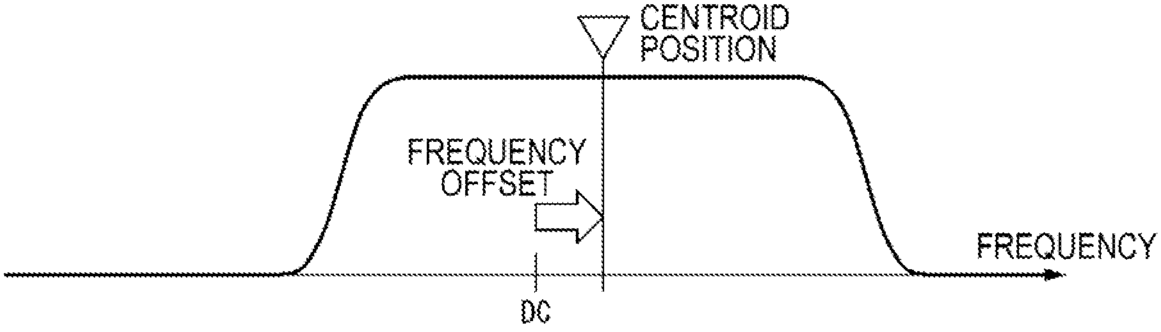
FIG. 2 is a diagram illustrating an example of a power spectrum of a reception signal with a frequency offset.

FIGS. 1 and 2 are diagrams for illustrating estimation of a frequency offset amount based on a centroid position of a power spectrum. FIGS. 1 and 2 illustrate a power spectrum of a reception signal converted from an optical signal into a baseband signal by coherent detection in the reception device.

FIG. 1 illustrates a power spectrum of a reception signal without a frequency offset. As illustrated, the centroid position of the power spectrum of the reception signal with no frequency offset coincides with a direct current (DC) position. On the other hand, FIG. 2 illustrates a power spectrum of a reception signal with a frequency offset. The position of the reception signal with the frequency offset is shifted by the frequency offset amount. Accordingly, as illustrated in FIG. 2, the centroid position of the power spectrum of the reception signal is also deviated from the DC position by the frequency offset amount. As a result, the frequency offset amount can be estimated in some cases.

However, in the method of estimating the frequency offset amount based on the deviation of the centroid position of the power spectrum, an error occurs in a case where the transmission line loss spectrum is asymmetric. For example, there is a case where an optical band-pass filter is used in a transmission path in optical fiber transmission, but in a case where a center wavelength of the optical band-pass filter and a center wavelength of a signal are relatively shifted, a signal spectrum becomes left-right asymmetric due to the optical band-pass filter. In this case, the deviation of the centroid position of the power spectrum does not match the frequency offset amount. Therefore, in order to estimate the frequency offset amount without being affected by the transmission line condition, it is necessary to use other feature amounts different from the centroid position of the power spectrum.

As another method of estimating the frequency offset amount, a method of estimating the frequency offset amount based on pattern matching can be considered. For example, it is conceivable to perform calculation of convolution of an expected value of a power spectrum and a power spectrum of a reception signal, and set the maximum value thereof as a frequency offset amount. However, even in this estimation method, there is no difference from the above-described method in that the error occurs when the transmission line loss spectrum is asymmetric.

Therefore, as still another method of estimating the frequency offset amount, a method of estimating the frequency offset amount based on the position of the spectrum edge of the reception signal is considered. In recent coherent optical transmission technology, a Nyquist molding signal having a small roll-off coefficient is often used. The spectrum of the Nyquist molding signal has a waveform in which both ends of the signal band are steeply cut off. The position of the steep edge does not change depending on the loss spectrum in the transmission line. Therefore, by detecting the spectrum edge of the reception signal, the frequency offset amount can be estimated with higher accuracy.

In recent years, for the purpose of reducing power consumption and suppressing waveform distortion due to a non-linear optical effect of an optical fiber, a subcarrier modulation method of dividing a signal band into a plurality of subcarriers is sometimes used. In subcarrier modulation, a spectrum gap is generated between subcarriers unlike other multi-carrier modulation schemes such as orthogonal frequency division multiplexing (OFDM). By detecting the position of this spectrum gap, it is possible to estimate the frequency offset with higher accuracy.

Figure 3:
FIG. 3 is a diagram illustrating an example of a spectrum of a Nyquist molded single carrier signal.
Figure 4:
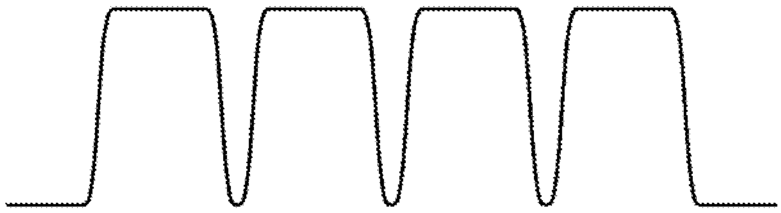
FIG. 4 is a diagram illustrating an example of a spectrum of a Nyquist molded multi-carrier signal.

FIG. 3 is a diagram illustrating an example of a spectrum of a Nyquist molded single carrier signal. In the case of a single carrier, the frequency offset amount can be estimated on the basis of the positions of roll-off (spectrum edge) at both ends of the reception signal. In addition, FIG. 4 is a diagram illustrating an example of a spectrum of a Nyquist molded multi-carrier signal. In the case of multicarrier, the frequency offset amount can be estimated based on at least one of a dip (spectrum gap) between subcarriers and a position of roll-off (spectrum edge) at both ends of the reception signal.

[Correlation Calculation Between Reception Signal Spectrum and Detection Pattern]

The reception device according to the present embodiment performs correlation calculation between a reception signal spectrum and a detection pattern in order to detect a spectrum edge or a spectrum gap. As the detection pattern, a pattern that specifically reacts only to the spectrum edge and the spectrum gap needs to be prepared in advance.

As the detection pattern for detecting the spectrum edge, for example, a pattern based on second differentiation of the expected value of the reception signal spectrum can be used. Here, the reception signal spectrum is $I_{sig}$(D) and the detection pattern is R(f). In a case were the detection pattern is configured by second differentiation of the reception signal spectrum $I_{sig}$(f), the detection pattern R(f) can be expressed as Equation (1) below.

[Math. 1]

$$R(f) = -\frac{d^2}{df^2} I_{sig} \tag{1}$$

The reception device can obtain the correlation pattern K(δ) expressed by Equation (2) below by calculating the correlation between the reception signal spectrum $I_{sig}$(I) and the detection pattern R(f).

[Math. 2]

$$K(\delta)=\int I_{sig}(f)R(f-\delta)df \tag{2}$$

Since the correlation pattern K(δ) has a sharp peak at the position of the frequency offset, the reception device can estimate that δ giving the maximum value of the correlation pattern K(δ) is the value of the frequency offset amount.

The reception device may use the expected value of the reception signal spectrum itself as the detection pattern R(f). However, when the value of the second differentiation is used rather than the expected value of the reception signal spectrum itself, the steep spectrum edge can be obtained, so that the occurrence of an error is further suppressed.

Figure 5:
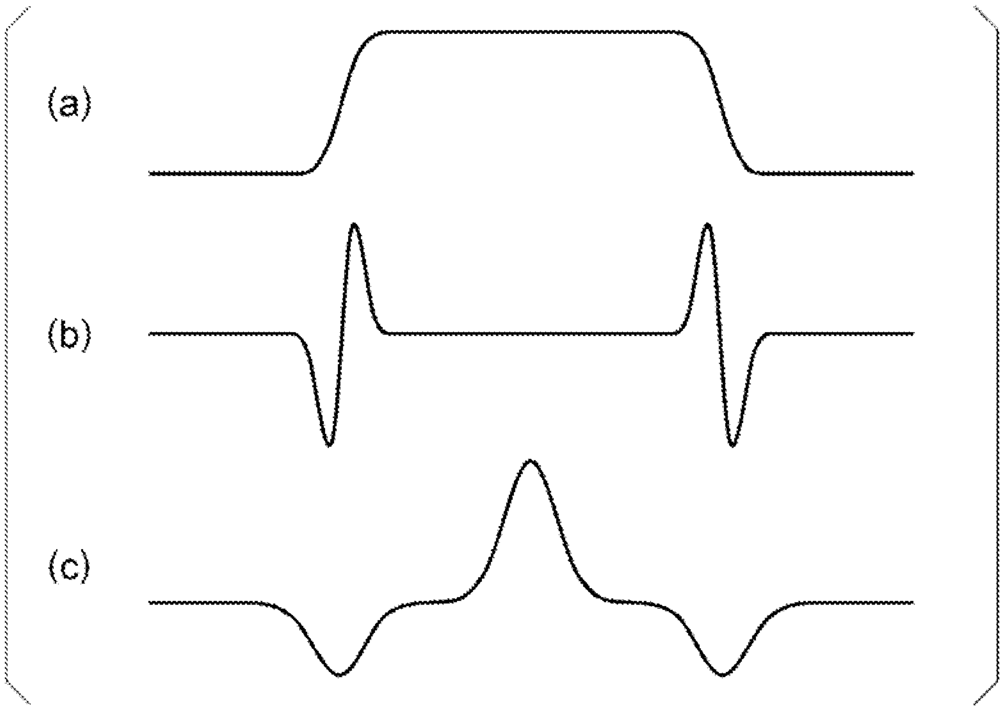
FIG. 5 is a diagram illustrating an example of correlation calculation between a reception signal spectrum and a detection pattern in the case of a single carrier signal.

FIG. 5 is a diagram illustrating an example of correlation calculation between a reception signal spectrum and a detection pattern in the case of a single carrier signal. In FIG. 5, (a) illustrates a reception signal spectrum $I_{sig}$(f), (b) illustrates a detection pattern R(f), and (c) illustrates a correlation pattern K(δ) that is a result of correlation calculation between the reception signal spectrum and the detection pattern.

As illustrated in (c) of FIG. 5, since the correlation pattern K(δ) has a steep peak at a position corresponding to the center of the reception signal, the reception device can estimate the frequency offset amount by detecting the peak position.

Figure 6:
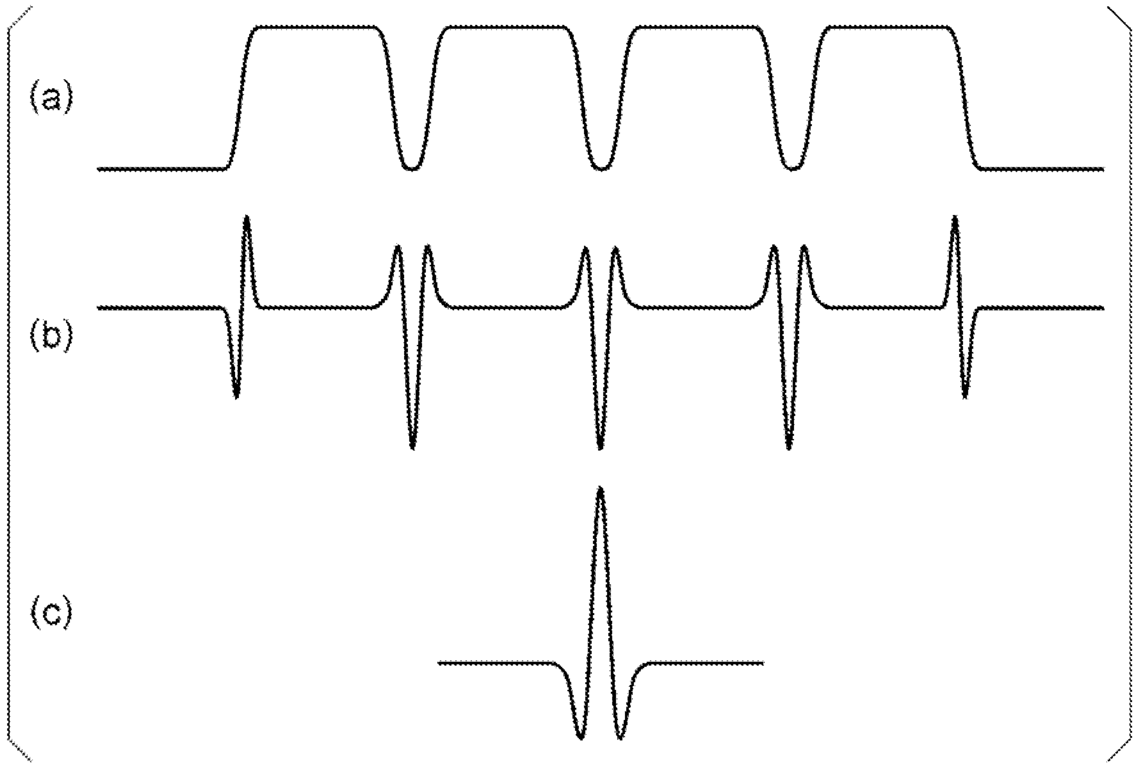
FIG. 6 is a diagram illustrating an example of correlation calculation between a reception signal spectrum and a detection pattern in the case of a multi-carrier signal.

FIG. 6 is a diagram illustrating an example of correlation calculation between a reception signal spectrum and a detection pattern in the case of a multi-carrier signal. In FIG. 6. (a) illustrates a reception signal spectrum $I_{sig}$(f), (b) illustrates a detection pattern R(f), and (c) illustrates a correlation pattern K(δ) that is a result of correlation calculation between the reception signal spectrum and the detection pattern.

As illustrated in (c) of FIG. 6, since the correlation patter K(δ) has a steep peak at a position corresponding to the center of the reception signal, the reception device can estimate the frequency offset amount by detecting the peak position. Note that only the correlation pattern K(δ) near the origin is drawn in (c) of FIG. 6.

The reception device may use a Hermitian wavelet as the detection pattern R(f) instead of using the derivative of the expected value of the reception signal spectrum. The Hermitian wavelet is obtained by normalizing an N-order derivative of a Gaussian function with L2 norm and then inverting the sign. A wavelet based on the first-order derivative of the Gaussian function is called a first-order Hermitian wavelet, and is represented as by $\psi_1$ here. In addition, a wavelet based on the second-order derivative of the Gaussian function is called a second-order Hermitian wavelet, and is represented as by $\psi_2$ here.

The first-order Hermitian wavelet $\psi_1$ can be used as a spectrum edge detection pattern R(f). The first-order Hermitian wavelet $\psi_1$ is expressed as Equation (3) below.

[Math. 3]

$$\psi_1(x) = \sqrt{2}\pi^{-\frac{1}{4}} x e^{-\frac{x^2}{2}} \tag{3}$$

Figure 7:
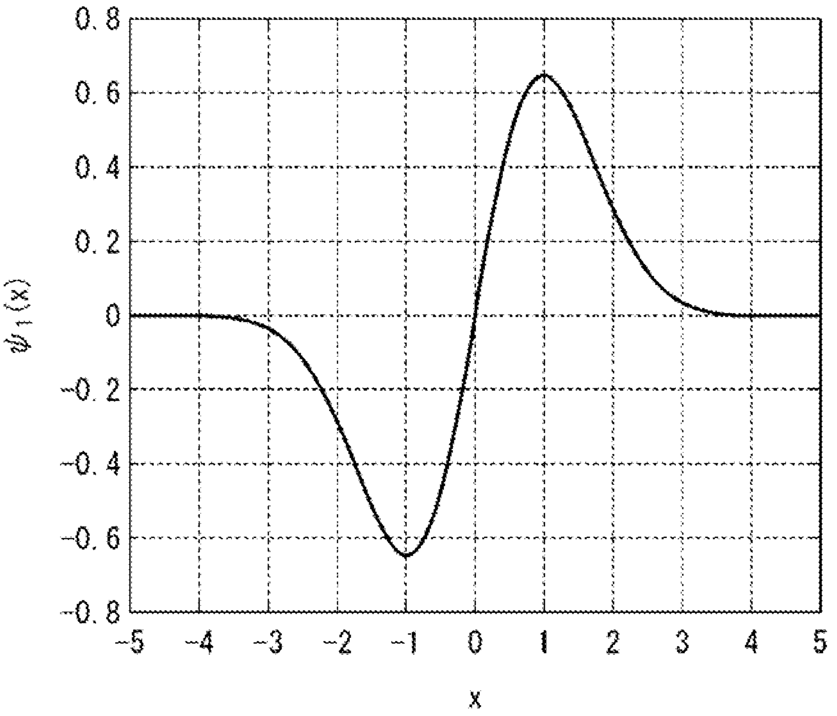
FIG. 7 is a diagram plotting first-order Hermitian wavelets.

FIG. 7 is a diagram plotting a Hermitian wavelet $\psi_1(x)$ represented by Equation (3).

The second-order Hermitian wavelet $\psi_2$ can be used as a spectrum gap detection pattern R(f) by inverting the sign. The second-order Hermitian wavelet $\psi_2$ is expressed as Equation (4) below.

[Math. 4]

$$\psi_2(x) = \frac{2}{3}\sqrt{3}\pi^{-\frac{1}{4}}(1-x)e^{-\frac{x^2}{2}} \quad (4)$$

Figure 8:
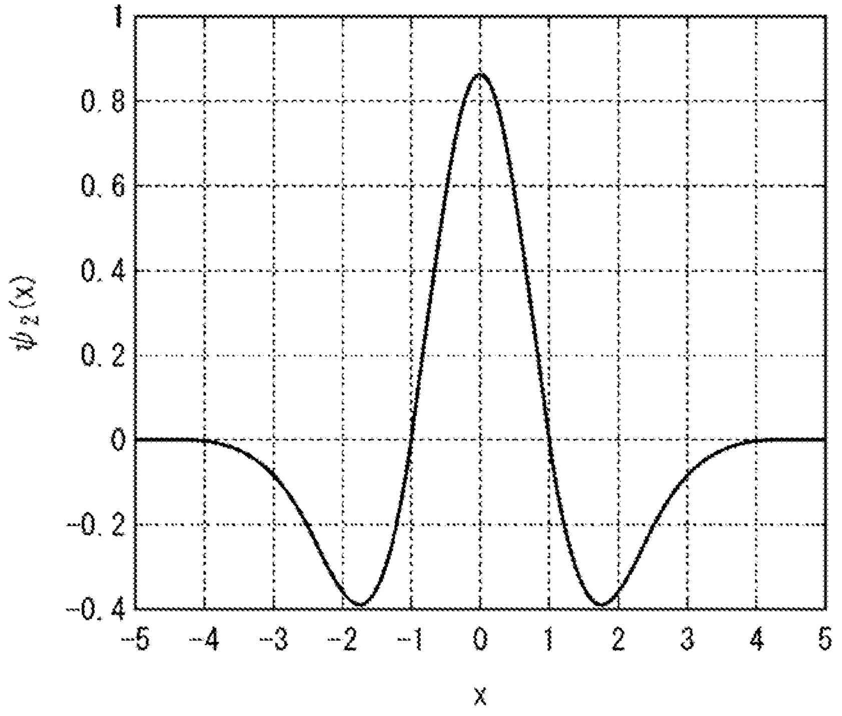
FIG. 8 is a diagram plotting second-order Hermitian wavelets.

FIG. 8 is a diagram plotting a Hermitian wavelet $\psi_2(x)$ represented by Equation (4).

Furthermore, the reception device may configure the detection pattern R(f) by using a plurality of wavelets in combination according to the shape of the reception signal spectrum.

[Reduction of Calculation Amount]

Figure 9:
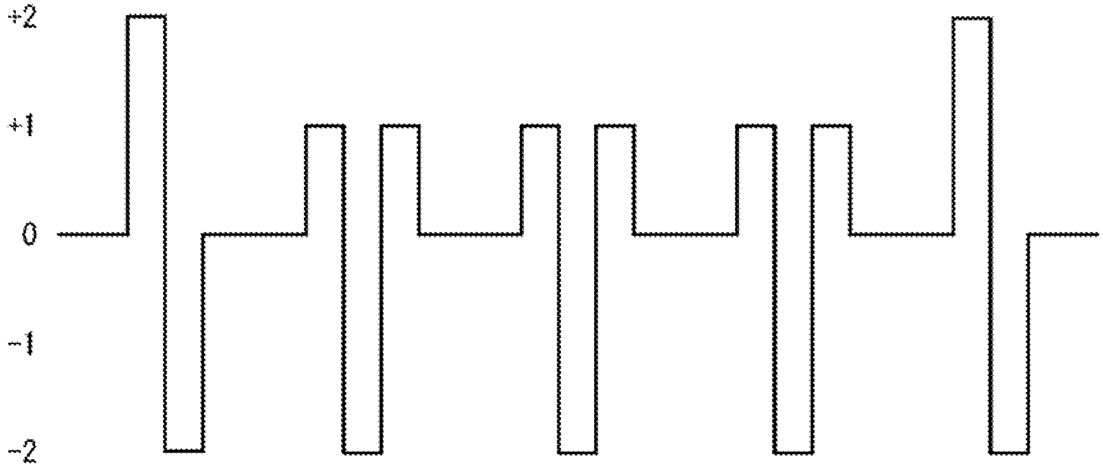
FIG. 9 is a diagram illustrating an example of a detection pattern formed in a rectangular shape.

Note that the reception device may perform correlation calculation by replacing the detection pattern R(f) with a simpler pattern for the purpose of reducing the amount of calculation. In the calculation by a digital circuit, since the calculation of a power-of-two multiple and the calculation over power of 2 can be configured only by the bit shift, the calculation amount is reduced as compared with the integration by an arbitrary coefficient. Instead of using the Hermitian wavelet, for example, the reception device may replace a simple pattern formed in a rectangular shape as illustrated in FIG. 9 with the detection pattern R(f). FIG. 9 is a diagram illustrating an example of a detection pattern for a multi-carrier signal having a 4-subcarrier configuration, which is configured in a rectangular shape for the purpose of reducing the amount of calculation.

[Functional Configuration of Reception Device]

Figure 10:
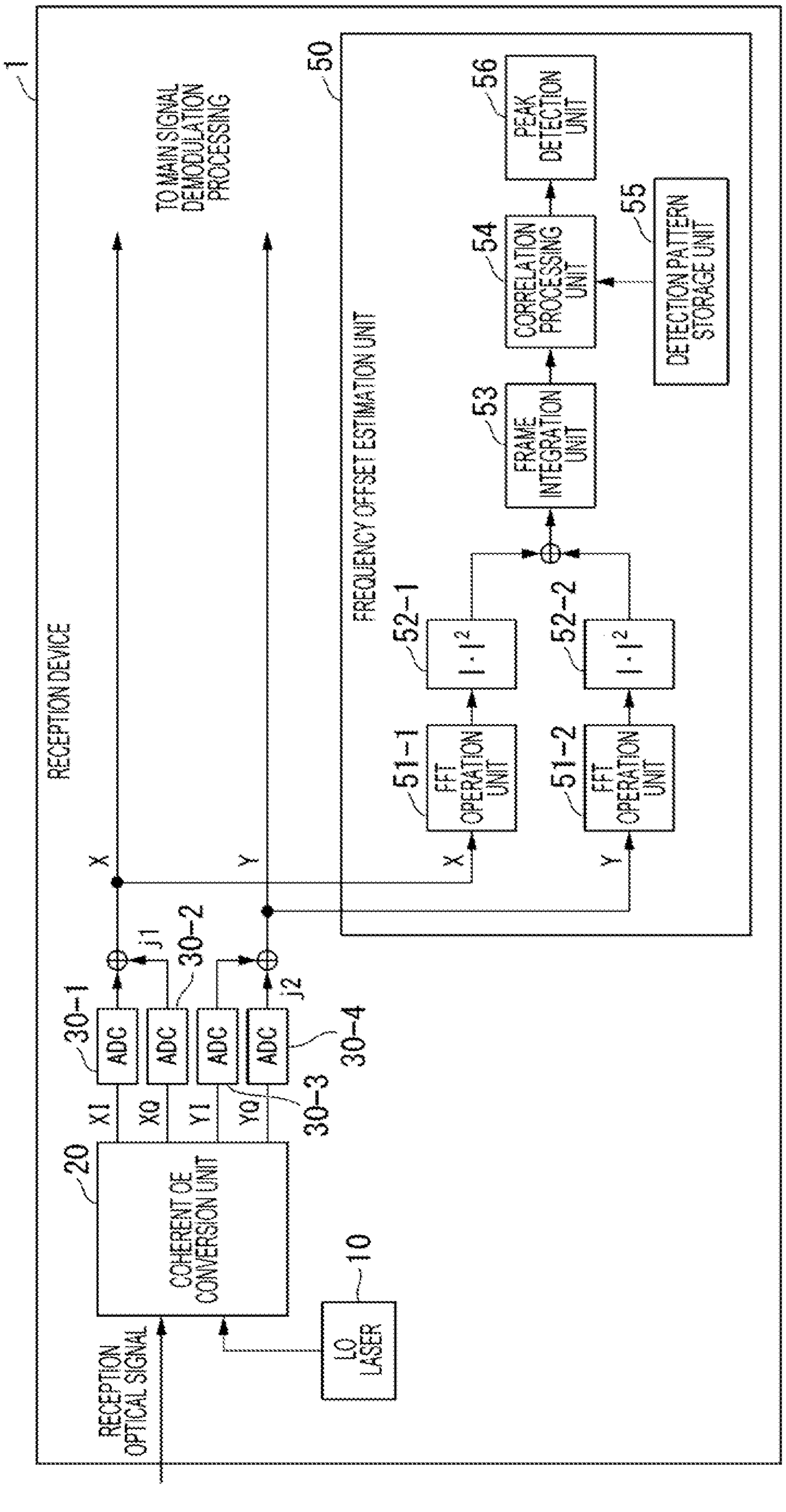
FIG. 10 is a block diagram illustrating a functional configuration of a reception device 1 according to an embodiment of the present invention.

Hereinafter, a functional configuration of the reception device 1 will be described. FIG. 10 is a block diagram illustrating an example of a functional configuration of the reception device 1 according to an embodiment of the present invention. As illustrated in FIG. 10, the reception device 1 includes an LO laser 10, a coherent optical to electrical (OE) conversion unit 20, ADCs 30-1 to 30-4, and a frequency offset estimation unit 50.

The LO laser 10 is a local oscillation laser, and outputs local oscillation light whose phase matches the frequency of the reception optical signal. The coherent OE conversion unit 20 performs coherent detection on the reception optical signal using the local oscillation light output from the LO laser 10 and converts the reception optical signal into a 4-lane baseband electric signal.

Each of four analog to digital converters (ADCs) 30-1 to 30-4 takes in an electric signal of four lanes output from the coherent OE conversion unit 20 and converts the electric signal into a digital signal. The 4-lane digital signals are in-phase and quadrature components of horizontal polarization and in-phase and quadrature components of vertical polarization of the reception optical signal. An imaginary unit multiplication unit j1 and an imaginary unit multiplication unit j2 are connected to the ADC 30-2 and the ADC 30-4 that output quadrature components, respectively.

The imaginary unit multiplication unit j1 advances the phase of the quadrature component output from the ADC 30-2 by 90 degrees on the complex plane and outputs the phase. The output of the ADC 30-1 and the output of the imaginary unit multiplication unit j1 are combined to generate a horizontally polarized reception signal having an in-phase component output from the ADC 30-1 as a real component and a quadrature component output from the imaginary unit multiplication unit j1 as an imaginary component. In addition, the imaginary unit multiplication unit j2 advances the phase of the quadrature component output from the ADC 30-4 by 90 degrees on the complex plane and outputs the phase. The output of the ADC 30-3 and the output of the imaginary unit multiplication unit j2 are combined to generate a vertically polarized reception signal having an in-phase component output from the ADC 30-3 as a real component and a quadrature component output from the imaginary unit multiplication unit j2 as an imaginary component.

The horizontally polarized reception signal and the vertically polarized reception signal, which are converted into the digital signals and are represented by complex numbers, are output to a demodulation processing block (not illustrated) of a main signal at a subsequent stage in the reception device 1. Thereafter, demodulation processing is performed on the digitized reception signal to extract an information bit from the reception signal.

In addition, the horizontally polarized reception signal and the vertically polarized reception signal which are converted into the digital signals and are represented by the complex number are branched and also input to the frequency offset estimation unit 50. As illustrated in FIG. 10, the frequency offset estimation unit 50 includes FFT operation units 51-1 to 51-2, absolute value operation units 52-1 to 52-2, a frame integration unit 53, a correlation processing unit 54, a detection pattern storage unit 55, and a peak detection unit 56.

The FFT operation units 51-1 to 51-2 acquire the reception signal for each polarization branched and input. The FFT operation units 51-1 to 51-2 convert the reception signal for each polarization into a frequency domain by FFT. The FFT operation unit 51-1 outputs the reception signal converted into the frequency domain to the absolute value operation unit 52-1, and the FFT operation unit 51-2 outputs the reception signal converted into the frequency domain to the absolute value operation unit 52-2.

The absolute value operation unit 52-1 acquires the reception signal converted into the frequency domain output from the FFT operation unit 51-1. In addition, the absolute value operation unit 52-2 acquires the reception signal converted into the frequency domain output from the FFT operation unit 51-2. The absolute value operation units 52-1 to 52-2 square the absolute value of the reception signal converted into the frequency domain to generate a power spectrum.

Note that the absolute value operation units 52-1 to 52-2 may generate the amplitude spectrum only by taking absolute values for the reception signals converted into the frequency domain. The absolute value operation units 52-1 to 52-2 output the generated power spectrum (or amplitude spectrum) to the frame integration unit 53.

The frame integration unit 53 acquires the power spectrum (or the amplitude spectrum) output from the absolute value operation units 52-1 to 52-2. The frame integration unit 53 performs averaging by integrating the power spectrum (or the amplitude spectrum) over a plurality of FFT frames. This is to avoid the instantaneous fluctuation of the power spectrum (or the amplitude spectrum) of the reception signal from affecting the estimation accuracy of the frequency offset amount. The frame integration unit 53 outputs the integrated power spectrum (or absolute value spectrum) to the correlation processing unit 54.

The correlation processing unit 54 acquires the integrated power spectrum (or absolute value spectrum) output from the frame integration unit 53. In addition, the correlation processing unit 54 acquires the detection pattern stored in the detection pattern storage unit 55. The correlation processing unit 54 performs correlation calculation between the integrated power spectrum (or absolute value spectrum) and the detection pattern to obtain a correlation pattern. The correlation processing unit 54 outputs the correlation pattern to the peak detection unit 56.

The detection pattern storage unit 55 stores the detection pattern in advance. As described above, the detection pattern is a predetermined waveform pattern for detecting the spectrum edge or the spectrum gap of the reception signal spectrum.

The detection pattern storage unit 55 includes, for example, a storage medium such as a random access memory (RAM), a read only memory (ROM), a hard disk drive (HDD), or a solid state drive (SSD), or a combination of these storage media. Note that, for example, the detection pattern storage unit 55 may be provided in an external device instead of being provided in the reception device 1, and the reception device 1 may acquire the detection pattern from the external device.

The peak detection unit 56 acquires the correlation pattern output from the correlation processing unit 54. The peak detection unit 56 detects a peak position of the correlation pattern. The peak detection unit 56 assumes that the detected peak position is the center position of the power spectrum, and estimates a deviation between the peak position and the DC position as the frequency offset amount. The peak detection unit 56 outputs information indicating the estimated frequency offset amount to a compensation unit (not illustrated) that compensates for the frequency offset at a subsequent stage in the reception device 1. A compensation unit (not illustrated) compensates for the frequency offset based on the acquired information.

Modification Example

Figure 11:
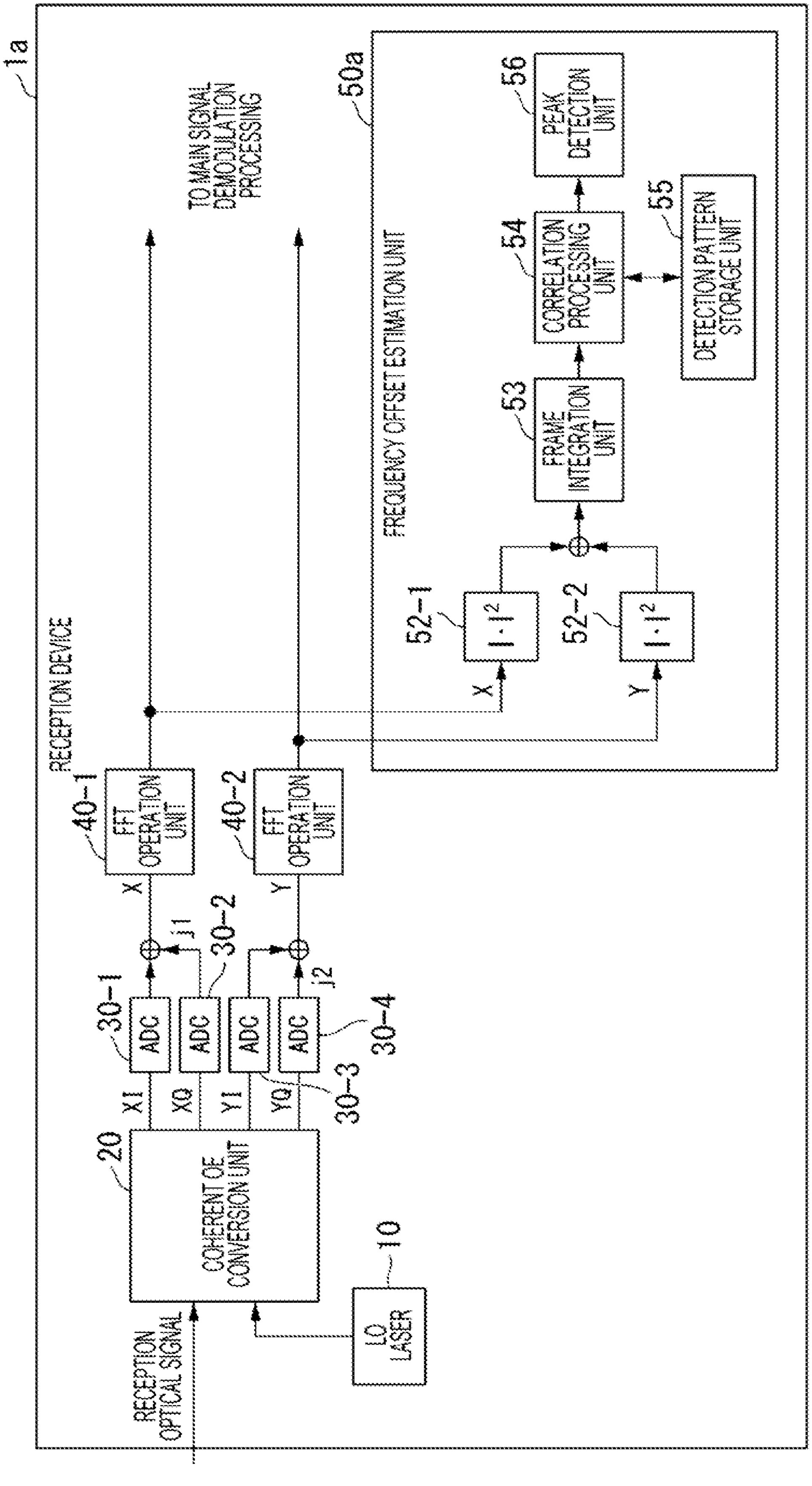
FIG. 11 is a block diagram illustrating a functional configuration of a reception device 1*a* according to a modification example of the embodiment of the present invention.

Note that the functional configuration of the reception device in the present embodiment may be, for example, the functional configuration of a reception device 1*a* illustrated in FIG. 11. The reception device 1*a* includes an LO laser 10, a coherent OE conversion unit 20, ADCs 30-1 to 30-4, FFT operation units 40-1 to 40-2, and a frequency offset estimation unit 50*a*. In addition, the frequency offset estimation unit 50*a* includes absolute value operation units 52-1 to 52-2, a frame integration unit 53, a correlation processing unit 54, a detection pattern storage unit 55, and a peak detection unit 56.

As illustrated in the drawing, the functional configuration of the reception device 1*a* in the present modification example is different from the functional configuration of the reception device 1 in that the frequency offset estimation unit 50*a* does not include the FFT operation unit, and instead, the FFT operation units 40-1 to 40-2 included in the reception signal processing function of the reception device 1*a* are used.

In general, a reception device of a coherent optical communication system often includes a wavelength dispersion compensator. In general, the wavelength dispersion compensator performs signal processing in a frequency domain. Therefore, the reception device of the coherent optical communication system often includes the FFT operation unit in advance. The reception device 1*a* of the present modification example is configured not to include the FFT operation unit in the frequency offset estimation unit 50*a*, but to share the FFT operation units 40-1 to 40-2 provided in advance in the reception device 1*a* to be used in the signal processing of the main signal in the frequency offset estimation processing.

(Operation of Reception Device)

Figure 12:
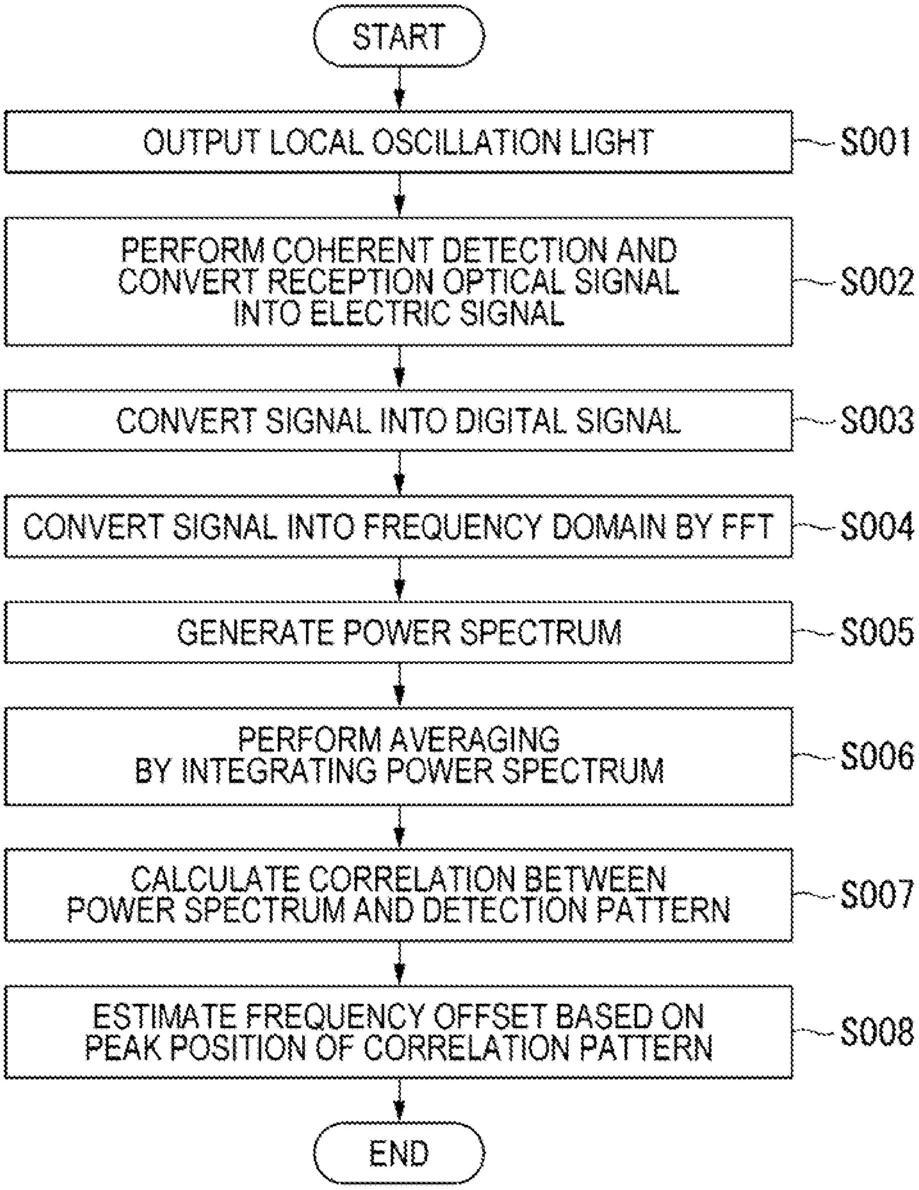
FIG. 12 is a flowchart illustrating an operation of the reception device 1 according to the embodiment of the present invention.

Hereinafter, an example of the operation of the reception device 1 in the present embodiment will be described. FIG. 12 is a flowchart illustrating an operation of the reception device 1 according to the embodiment of the present invention.

The LO laser 10 outputs local oscillation light whose phase matches the frequency of the reception optical signal (step S001). The coherent OE conversion unit 20 performs coherent detection on the reception optical signal using the local oscillation light output from the LO laser 10 and converts the reception optical signal into a 4-lane baseband electric signal (step S002).

Each of four ADCs 30-1 to 30-4 takes in an electric signal of four lanes output from the coherent OE conversion unit 20 and converts the electric signal into a digital signal (step S003). The imaginary unit multiplication unit j1 advances the phase of the quadrature component output from the ADC 30-2 by 90 degrees on the complex plane and outputs the phase. In addition, the imaginary unit multiplication unit j2 advances the phase of the quadrature component output from the ADC 30-4 by 90 degrees on the complex plane and outputs the phase.

The FFT operation units 51-1 to 51-2 convert the reception signal for each input polarization into a frequency domain by FFT (step S004). The absolute value operation units 52-1 to 52-2 square the absolute value of the reception signal converted into the frequency domain to generate a power spectrum (step S006).

The frame integration unit 53 performs averaging by integrating the power spectrum over a plurality of FFT frames (step S005). The correlation processing unit 54 performs correlation calculation between the integrated power spectrum and the detection pattern to obtain a correlation pattern (step S007). The peak detection unit 56 assumes the peak position of the correlation pattern as the position of the center of the power spectrum, and estimates the deviation between the peak position and the DC position as the frequency offset amount (step S008).

Thus, the operation of the reception device 1 illustrated in the flowchart of FIG. 12 ends. Note that the operation of the reception device 1*a* in the modification example is basically similar.

As described above, the reception device 1 according to the embodiment of the present invention and the reception device 1*a* according to the modification example of the embodiment of the present invention estimate the frequency offset amount by detecting the peak position of the correlation pattern obtained by calculating the correlation between the power spectrum or the amplitude spectrum of the reception signal and the detection pattern. In the case of single carrier modulation, the reception device 1 and the reception device 1*a* use a waveform pattern intended to detect the roll-off (spectrum edge) of the power spectrum or the amplitude spectrum as a detection pattern. Furthermore, in the case of multi-carrier modulation, the reception device 1 and the reception device 1*a* use, as a detection pattern, a waveform pattern intended to detect at least one of a dip (spectrum gap) between subcarriers and roll-off (spectrum edge) at both ends of a reception signal. For example, the reception device 1 and the reception device 1*a* use a waveform obtained by second differentiation and sign inversion of an envelope waveform of a power spectrum or an amplitude spectrum, or a function approximate to the waveform, as the detection pattern.

With such a configuration, the reception device 1 according to the embodiment of the present invention and the reception device 1*a* according to the modification example of the embodiment of the present invention estimate the frequency offset amount using the shape of the power spectrum that does not change due to optical fiber transmission. As a result, the reception device 1 and the reception device 1*a* can estimate and compensate for the frequency offset even using a reception signal in which signal distortion such as wavelength dispersion and polarization mode dispersion caused by optical fiber transmission is not compensated for. Therefore, the reception device 1 and the reception device 1*a* can estimate and compensate for the frequency offset prior to the signal processing for compensating for the signal distortion.

According to the above-described embodiment, the frequency offset estimation device (the frequency offset estimation apparatus) includes a correlation processing unit and an estimation unit. For example, the frequency offset estimation device is the frequency offset estimation unit 50 and the frequency offset estimation unit 50*a* in the embodiment, the correlation processing unit is the correlation processing unit 54 in the embodiment, and the estimation unit is the peak detection unit 56 in the embodiment. The correlation processing unit obtains a correlation pattern that is a waveform pattern indicating a correlation between the reception signal spectrum and the detection pattern based on the power spectrum of the reception signal or the reception signal spectrum indicating the amplitude spectrum based on the power spectrum and the detection pattern that is a predetermined waveform pattern. The estimation unit estimates the frequency offset amount based on the peak position of the correlation pattern obtained by the correlation processing unit.

The above detection pattern is a waveform pattern for detecting a spectrum edge of a reception signal in a case where the reception signal is a single carrier signal. Further, in a case where the reception signal is a multi-carrier signal, the waveform pattern is a waveform pattern for detecting at least one of a spectrum edge of the reception signal and a spectrum gap between subcarriers of the reception signal.

Note that the detection pattern may be a waveform pattern generated by using the second differentiation of the expected value of the reception signal spectrum or a rectangular pattern approximate to the waveform pattern.

The detection pattern for detecting the spectrum edge may be a waveform pattern generated based on a Hermitian wavelet based on a first derivative of a Gaussian function. In addition, the detection pattern for detecting the spectrum gap may be a waveform pattern generated based on a Hermitian wavelet based on a second derivative of a Gaussian function.

The detection pattern is a rectangular waveform pattern approximate to a waveform pattern generated based on the Hermitian wavelet.

A part or all of the reception device 1 and the reception device 1*a* in each of the above-described embodiments may be implemented by a computer. In that case, a program for implementing these functions may be recorded in a computer-readable recording medium, and the program recorded in the recording medium may be read and executed by a computer system to implement the functions. The “computer system” mentioned herein includes an OS and hardware such as a peripheral device. The “computer-readable recording medium” refers to a portable medium such as a flexible disk, a magneto-optical disc, a ROM, or a CD-ROM, or a storage device such as a hard disk included in the computer system. The “computer-readable recording medium” may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. In addition, the above program may be for implementing some of the functions described above, may be one that can implement the functions described above in combination with a program already recorded in the computer system, or may be one implemented by using a programmable logic device such as a field programmable gate array (FPGA).

While the embodiments of the present invention have been described in detail with reference to the drawings, specific configurations are not limited to these embodiments, and include designs and the like without departing from the spirit of the present invention.

REFERENCE SIGNS LIST

1, 1*a* reception device
10 LO laser
20 coherent OE conversion unit
40-1, 40-2 FFT operation unit
50, 50*a* frequency offset estimation unit
51-1, 51-2 FFT operation unit
52-1, 52-2 absolute value operation unit
53 frame integration unit
54 correlation processing unit
55 detection pattern storage unit
56 peak detection unit

The invention claimed is:

1. A frequency offset estimation device comprising:
absolute value operation units that square an absolute value of a reception signal converted into a frequency domain to generate a power spectrum or an amplitude spectrum based on the power spectrum;
a frame integration unit that performs averaging by integrating the power spectrum or the amplitude spectrum generated by the absolute value operation units over a plurality of FFT (Fast Fourier Transform) frames;
a detection pattern storage unit that stores a detection pattern in advance;
a correlation processing unit that performs correlation calculation between the power spectrum or the amplitude spectrum integrated by the frame integration unit and the detection pattern stored in the detection pattern storage unit to obtain a correlation pattern; and
a peak detection unit that detects a peak position of the correlation pattern obtained by the correlation processing unit, assumes that the detected peak position is a center position of the power spectrum or the amplitude spectrum, and estimates a deviation between the peak position and the DC (Direct Current) position as a frequency offset amount.

2. The frequency offset estimation device according to claim 1, wherein the detection pattern is a waveform pattern for detecting a spectrum edge of the reception signal in a case where the reception signal is a single carrier signal, and a waveform pattern for detecting at least one of a spectrum edge of the reception signal and a spectrum gap between subcarriers of the reception signal when the reception signal is a multi-carrier signal.

3. The frequency offset estimation device according to claim 1, wherein the detection pattern is a waveform pattern generated using second differentiation of an expected value of the reception signal spectrum or a rectangular pattern approximate to the waveform pattern.

4. The frequency offset estimation device according to claim 2, wherein the detection pattern for detecting the spectrum edge is a waveform pattern generated based on a Hermitian wavelet based on a first derivative of a Gaussian function, and the detection pattern for detecting the spectrum gap is a waveform pattern generated based on a Hermitian wavelet based on a second derivative of a Gaussian function.

5. The frequency offset estimation device according to claim 4, wherein the detection pattern is a rectangular waveform pattern approximate to a waveform pattern generated based on the Hermitian wavelet.

6. A reception device of a coherent optical communication system, the device comprising:

absolute value operation units that square an absolute value of a reception signal converted into a frequency domain to generate a power spectrum or an amplitude spectrum based on the power spectrum;

a frame integration unit that performs averaging by integrating the power spectrum or the amplitude spectrum generated by the absolute value operation units over a plurality of FFT (Fast Fourier Transform) frames;

a detection pattern storage unit that stores a detection pattern in advance;

a correlation processing unit that performs correlation calculation between the power spectrum or the amplitude spectrum integrated by the frame integration unit and the detection pattern stored in the detection pattern storage unit to obtain a correlation pattern;

a peak detection unit that detects a peak position of the correlation pattern obtained by the correlation processing unit, assumes that the detected peak position is a center position of the power spectrum or the amplitude spectrum, and estimates a deviation between the peak position and the DC (Direct Current) position as a frequency offset amount; and a compensator that compensates for a frequency offset based on the frequency offset amount estimated by the peak detection unit.

7. A frequency offset estimation method comprising:

a correlation processing step of obtaining, by a computer, a correlation pattern indicating a correlation between a reception signal spectrum and a detection pattern based on a power spectrum of the reception signal or the reception signal spectrum indicating an amplitude spectrum based on the power spectrum and the detection pattern that is a predetermined waveform pattern; and an estimation step of estimating, by the computer, a frequency offset amount based on a peak position of the correlation pattern obtained by the correlation processing step.

* * * * *